(12) United States Patent
Trimble

(10) Patent No.: US 7,953,878 B1
(45) Date of Patent: May 31, 2011

(54) MULTI-THREADED INTERNET SMALL COMPUTER SYSTEM INTERFACE (ISCSI) SOCKET LAYER

(75) Inventor: Carlisle Cobb Trimble, Raleigh, NC (US)

(73) Assignee: NetApp, Inc., Sunnyvale, CA (US)

( * ) Notice: Subject to any disclaimer, the term of this patent is extended or adjusted under 35 U.S.C. 154(b) by 444 days.

(21) Appl. No.: 11/869,365

(22) Filed: Oct. 9, 2007

(51) Int. Cl.
*G06F 15/16* (2006.01)
(52) U.S. Cl. .................... 709/230; 718/106; 709/223
(58) Field of Classification Search .................... 709/230
See application file for complete search history.

(56) References Cited

U.S. PATENT DOCUMENTS

| | | | |
|---|---|---|---|
| 7,287,258 B1* | 10/2007 | Salmon et al. ............... | 719/328 |
| 7,664,938 B1* | 2/2010 | Tripathi et al. ............... | 712/220 |
| 2002/0194338 A1* | 12/2002 | Elving ........................... | 709/226 |
| 2003/0097607 A1* | 5/2003 | Bessire ............................. | 714/5 |
| 2004/0148376 A1* | 7/2004 | Rangan et al. ............... | 709/223 |
| 2004/0205754 A1* | 10/2004 | Gazda et al. .................. | 718/100 |
| 2004/0216125 A1* | 10/2004 | Gazda et al. .................. | 719/310 |
| 2005/0138091 A1* | 6/2005 | Bono ............................. | 707/205 |
| 2006/0013222 A1* | 1/2006 | Rangan et al. ............... | 370/389 |
| 2006/0013253 A1* | 1/2006 | Hufferd ........................ | 370/466 |
| 2006/0242532 A1* | 10/2006 | Joglekar et al. .............. | 714/758 |
| 2006/0271734 A1* | 11/2006 | Strange et al. ............... | 711/114 |
| 2007/0019636 A1* | 1/2007 | Lau et al. ..................... | 370/360 |
| 2007/0070975 A1* | 3/2007 | Otani et al. ................... | 370/351 |
| 2007/0078819 A1* | 4/2007 | Zayas et al. ........................ | 707/2 |
| 2007/0162631 A1* | 7/2007 | Balakrishnan et al. ......... | 710/15 |
| 2007/0168693 A1* | 7/2007 | Pittman ............................. | 714/4 |
| 2007/0174850 A1* | 7/2007 | El Zur ............................ | 719/321 |
| 2007/0208821 A1* | 9/2007 | Pittman ......................... | 709/213 |
| 2008/0082966 A1* | 4/2008 | Dorn et al. .................... | 717/120 |
| 2008/0134196 A1* | 6/2008 | Madriles et al. .............. | 718/106 |
| 2008/0163215 A1* | 7/2008 | Jiang et al. .................... | 718/100 |
| 2008/0184233 A1* | 7/2008 | Norton et al. ................. | 718/100 |
| 2008/0244118 A1* | 10/2008 | Accapadi et al. .............. | 710/56 |
| 2009/0006502 A1* | 1/2009 | Leung et al. .................. | 707/205 |
| 2009/0125907 A1* | 5/2009 | Wen et al. ..................... | 718/101 |

* cited by examiner

*Primary Examiner* — Firmin Backer
*Assistant Examiner* — Hamza Algibhah
(74) *Attorney, Agent, or Firm* — Stattler-Suh PC

(57) ABSTRACT

Embodiments herein provide a computer system having an operating system that implements a multi-threaded iSCSI socket software layer. The multi-threaded iSCSI socket software layer may operate in conjunction with a single-threaded iSCSI protocol software layer to process network data according to the iSCSI protocol standard. Provided are protections against operational incompatibilities between the multi-threaded iSCSI socket layer and the single-threaded iSCSI protocol layer. A unique identifier may be assigned to each iSCSI socket thread to ensure proper delivery of thread messages to the appropriate iSCSI socket thread. A separate freed list may be allocated for each iSCSI socket thread, wherein the iSCSI protocol thread adds data structures to the freed list and a single iSCSI socket thread removes and uses data structures from the freed list. The multi-threaded iSCSI socket software layer reduces processor idle time, thus increasing data processing efficiency and overall network data throughput.

16 Claims, 9 Drawing Sheets

MULTI-THREADED INTERNET SMALL COMPUTER SYSTEM INTERFACE (iSCSI) SOCKET LAYER

FIELD OF THE INVENTION

The present invention relates to computer systems and, more specifically, to providing a multi-threaded Internet small computer system interface (iSCSI) socket layer.

BACKGROUND

A storage system is a processing system adapted to store and retrieve information/data on storage devices, such as disks. Each "on-disk" file may be implemented as a set of disk blocks configured to store information, such as text, whereas each directory may be implemented as a specially-formatted file in which information about other files and directories are stored.

The storage operating system generally refers to the computer-executable code operable on a storage system that manages data access and access requests and may implement file system semantics in implementations involving storage systems. In this sense, the Data ONTAP™ storage operating system, available from Network Appliance, Inc. of Sunnyvale, Calif., is an example of such a storage operating system implemented as a microkernel within an overall protocol stack and associated disk storage. The storage operating system can also be implemented as an application program operating over a general-purpose operating system, such as UNIX® or Windows®, or as a general-purpose operating system with configurable functionality, which is configured for storage applications as described herein.

A storage system's disk storage is typically implemented as one or more storage volumes that comprise physical storage disks, defining an overall logical arrangement of storage space. Available storage system implementations can serve a large number of discrete volumes, such as 150 or more. A storage volume is "loaded" in the storage system by copying the logical organization of the volume's files, data, and directories, into the storage system's memory. Once a volume has been loaded in memory, the volume may be "mounted" by one or more users, applications, devices, and the like, that are permitted to access its contents and navigate its namespace. As used herein, a volume is said to be "in use" when it is loaded in a storage system's memory and at least one user, application, etc., has mounted the volume and modified its contents.

A storage system may be configured to allow client systems to access the storage system. In this model, the client may comprise an application executing on a computer that "connects" to the storage system over a computer network, such as a point-to-point link, shared local area network (LAN), wide area network (WAN), or virtual private network (VPN) implemented over a public network such as the Internet. Communications between the storage system and its clients are typically implemented through transfer of protocol formatted packets sent over the computer network. Each client may request the services of the storage system by issuing file-system protocol messages/packets formatted in accordance with a conventional protocol, such as the Common Internet File System (CIFS), Network File System (NFS) protocol, or Fibre Channel Protocol (FCP).

Also, a conventional protocol used for storage systems implementing Storage Area Network (SAN) access technology is Internet Small Computer System Interface (iSCSI). In general, a computer system (e.g., storage system or client) may receive and transmit iSCSI formatted packets over a network by implementing an iSCSI subsystem software layer comprising an iSCSI socket layer and an iSCSI protocol layer. Typically, the iSCSI socket layer is implemented by the operating system of the computer system as a single-threaded layer so that data packets are processed by the iSCSI socket layer by only a single-thread at any given time. In a multi-threaded capable computer system (especially multiprocessor computer systems), implementing the iSCSI socket layer as a single-threaded layer decreases packet processing efficiency and overall network data throughput. As such, there is a need for a method of implementing the iSCSI socket layer as a multi-threaded layer to increase packet processing efficiency and overall network data throughput.

SUMMARY

Embodiments described herein provide a computer system having an operating system that implements a multi-threaded iSCSI socket software layer. The iSCSI socket software layer operates in conjunction with an iSCSI protocol software layer to process network data (i.e., data received over a network and data to be transmitted over the network). By operating the iSCSI socket software layer as a multi-threaded layer rather than a single-threaded layer, processor idle/down time of the computer system may be reduced, thus increasing data processing efficiency and overall network data throughput.

The iSCSI socket layer and iSCSI protocol layer comprise an iSCSI subsystem layer that implements the iSCSI protocol standard. The iSCSI subsystem layer processes iSCSI formatted packets received over a network and processes data into iSCSI formatted packets to be transmitted over a network. The iSCSI subsystem layer is one of several software layers of the operating system used to process network data. For example, the iSCSI socket layer interacts with a network stack layer while the iSCSI protocol layer interacts with a SCSI target layer to process network data. Some software layers of the operating system (such as the network stack layer) are implemented as a multi-threaded layer. Typically, however, the iSCSI socket layer and the iSCSI protocol layer are based on single-threaded operations. In some embodiments, the iSCSI socket layer is implemented as a multi-threaded layer while the iSCSI protocol layer is still implemented as a single-threaded layer. As such, multi-threaded network throughput benefits may be gained through the iSCSI socket layer while maintaining compatibility with the existing single-threaded iSCSI Protocol Layer. In some embodiments, protections against possible operational incompatibilities between the multi-threaded iSCSI socket layer and the single-threaded iSCSI protocol layer are provided.

Typically, a data packet is processed by a number of different processing threads, each thread implementing/executing a particular software layer of the operating system to process the data packet and then passing the data packet to the next thread for further processing. When processing data packets, the processing threads may pass messages (thread messages) to each other using a message passing scheme provided by the operating system, the thread messages containing information needed to properly process data packets between the threads. Typically, thread messages are easily passed between the iSCSI socket thread and the iSCSI protocol thread since there is typically only a single iSCSI socket thread and a single iSCSI protocol thread provided by the operating system.

In a multi-threaded iSCSI socket layer, however, mechanisms for delivery of thread messages from a single iSCSI protocol thread to the appropriate one of several iSCSI socket threads may be needed for proper processing of the data packets. In some embodiments, each iSCSI socket thread is identified by a unique identifier (e.g., as provided by the operating system) to assure delivery of thread messages to the proper iSCSI socket thread. In some embodiments, the identifier of a particular iSCSI socket thread may be stored to a shared data structure (i.e., a data structure that is accessible by both the particular iSCSI socket thread and the iSCSI protocol thread) and may be retrieved by the iSCSI protocol thread to identify which iSCSI socket thread to send a thread message.

Also, when receiving network packets over a network, an iSCSI socket thread processes the network packets, stores the processed network packets to a data buffer, and stores processing information to a data structure. The iSCSI protocol thread then processes the network packets in the data buffer according to the processing information stored in the data structure. When the iSCSI protocol thread completes its processing operations, the data structure and buffer may be freed for later use by an iSCSI socket thread that again stores processing information to the data structure and processed packets to the data buffer for processing by the iSCSI protocol thread. This process repeats continuously to re-use/recycle the data structures and data buffers within the iSCSI subsystem layer without requiring further data structure and data buffer allocations to the iSCSI subsystem layer by the operating system and processor.

Typically, the iSCSI protocol thread adds freed data structures and data buffers to a single "freed list" stored in memory. The iSCSI protocol thread is sometimes referred to as a "producer" for the freed list since it adds data structures or buffers to the freed list. The iSCSI socket thread is sometimes referred to as a "consumer" for the freed list since it removes and uses data structures or buffers from the list. Typically, a single iSCSI protocol thread (producer) adds data structures or buffers to a single freed list and a single iSCSI socket thread (consumer) removes and uses data structures or buffers from the single freed list. When implementing multiple iSCSI socket threads, however, two or more iSCSI socket threads (two or more consumers) may attempt to simultaneously remove and use the same data structure or buffer from the same freed list, thus causing data structure or buffer usage conflicts. In some embodiments, to avoid such data structure or buffer usage conflicts when implementing multiple iSCSI socket threads, a separate freed list is provided for each iSCSI socket thread from which the single iSCSI protocol thread adds data structures and from which an iSCSI socket thread removes and uses data structures. As such, each freed list again has a single producer (the single iSCSI protocol thread) and a single consumer (a particular iSCSI socket thread), thus avoiding data structure and buffer usage conflicts.

Embodiments described herein provide a multi-threaded iSCSI socket layer and protections against operational incompatibilities between the multi-threaded iSCSI socket layer and the single-threaded iSCSI protocol layer. As such, the iSCSI socket software layer may be operated as a multi-threaded layer rather than a single-threaded layer. By doing so, processor idle/down time of the computer system may be reduced to increase data processing efficiency and overall network data throughput, while still being compatible with a single-threaded iSCSI protocol layer.

DETAILED DESCRIPTION

In the following description, numerous details and alternatives are set forth for purpose of explanation. However, one of ordinary skill in the art will realize that embodiments can be practiced without the use of these specific details. In other instances, well-known structures and devices are shown in block diagram form to not obscure the embodiments with unnecessary detail.

The description that follows is divided into three sections. Section I describes a storage system environment in which some embodiments operate. Section II describes multi-threaded and single-threaded software layers of an operating system, including a multi-threaded iSCSI socket layer. Section III describes protections provided against operational incompatibilities between a multi-threaded iSCSI socket layer and a single-threaded iSCSI protocol layer.

I. Storage System Environment

Figure 1:
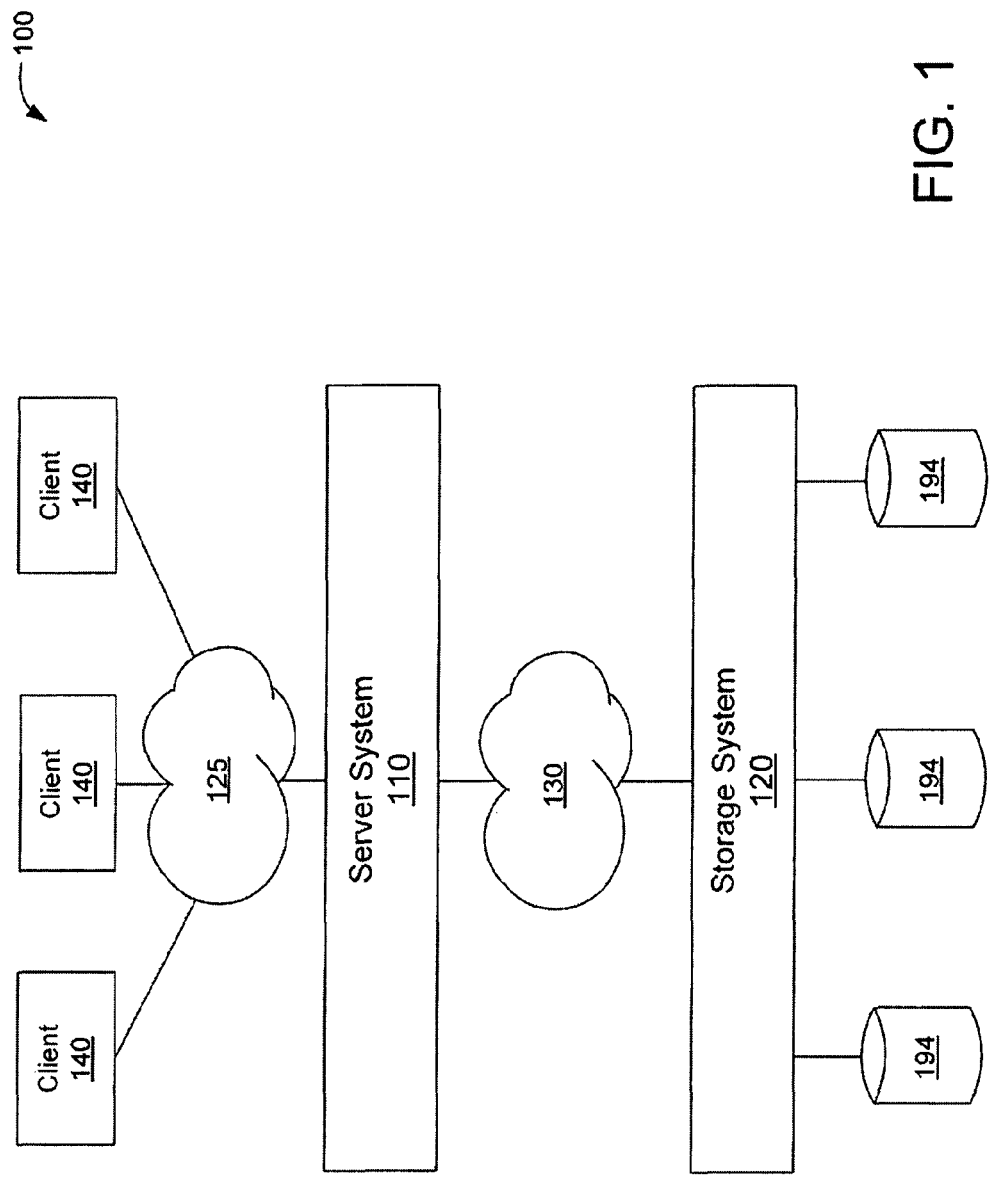
FIG. 1 is a schematic block diagram of an exemplary storage system environment in which some embodiments operate.

FIG. 1 is a block diagram of an exemplary storage system environment 100 in which some embodiments operate. The environment 100 comprises a server system 110 connected to multiple client systems 140 via a network 125. The environment 100 further comprises a storage system 120 having a set of mass storage devices 194 providing a set of storage volumes connected to the server system 110 via a network 130.

The server system 110 is a computer that handles requests for data, electronic mail, file transfers, or other network services from client systems 140. The server system 110 can be connected to clients 140 over the network 125, such as a Local Area Network (LAN), Wide Area Network (WAN), or the like. The server system 110 may execute applications including applications that require receiving or transmitting data (using a network device) to various clients 140 over the network 125. Likewise, the various clients 140 may execute applications that require receiving or transmitting data (using a network device) to the server system 110 over the network 125.

The server system 110 utilizes services of the storage system 120 to store and manage information in a set of mass storage devices 194. Interaction between the server system 110 and the storage system 120 can enable the provision of storage services. That is, the server system 110 may request the services of the storage system 120, and the storage system 120 may return the results of the services requested by the server system 110, by exchanging data packets over the network 130. The server system 110 may execute applications that require receiving or transmitting data to the storage system 120 over the network 130. The storage system 120 may respond to requests of the server system 110 by receiving or transmitting data (using a network device) to the server system 110 over the network 130.

In some embodiments, the server system 110 may issue packets using the Internet Small Computer Systems Interface (iSCSI) protocol encapsulated over Transport Control Protocol (TCP) when accessing information on the storage system 120. In these embodiments, the server system 110 may receive and transmit iSCSI formatted packets over a network by implementing an iSCSI subsystem software layer comprising an iSCSI socket layer and an iSCSI protocol layer. The storage system 120 may be coupled locally to the server system 110 over the network 130, such as a local area network (LAN), a wide area network (WAN), metropolitan are network (MAN), or the Internet.

As described herein, the storage system 120 stores data in a set of mass storage devices 194, preferably on one or more writable storage device media such as magnetic disks, video tape, optical, DVD, magnetic tape, and any other similar media adapted to store information, including data and parity information. For illustrative purposes, however, as described herein, the data is stored on disks 194. The disks 194 are typically organized as one or more groups of Redundant Array of Independent (or Inexpensive) Disks (RAID). The server system 110 utilizes services of the storage system 120 to store and manage data in a set of mass disks 194 that provide a set of storage volumes, where each volume may comprise one or more RAID groups. As known in the art, a disk 194 may have one or more storage volumes, where each volume has a file system implemented on the volume. A file system provides a logical/virtual representation of how data (files) are organized on a volume, where data (files) are represented as filenames that are organized in one or more directories. Examples of common file systems include New Technology File System (NTFS), File Allocation Table (FAT), Hierarchical File System (HFS), Universal Disk Format (UDF), UNIX® file system, and the like.

For the Data ONTAP™ storage operating system which may implement a WAFL™ file system, there is typically a WAFL file system within each volume, and within a WAFL file system, there may be one or more files representing SCSI Logical Units (LUNs). Within a LUN, there may typically be a server file system. In general, a Logical Unit (LU) may comprise a SCSI object within a target that processes commands. A Logical Unit Number (LUN) may comprise the SCSI identifier for a Logical Unit (LU). For example, a disk may be a Logical Unit with an associated Logical Unit Number. As used herein, the term LUN may be used to refer to the Logical Unit itself.

Figure 2:
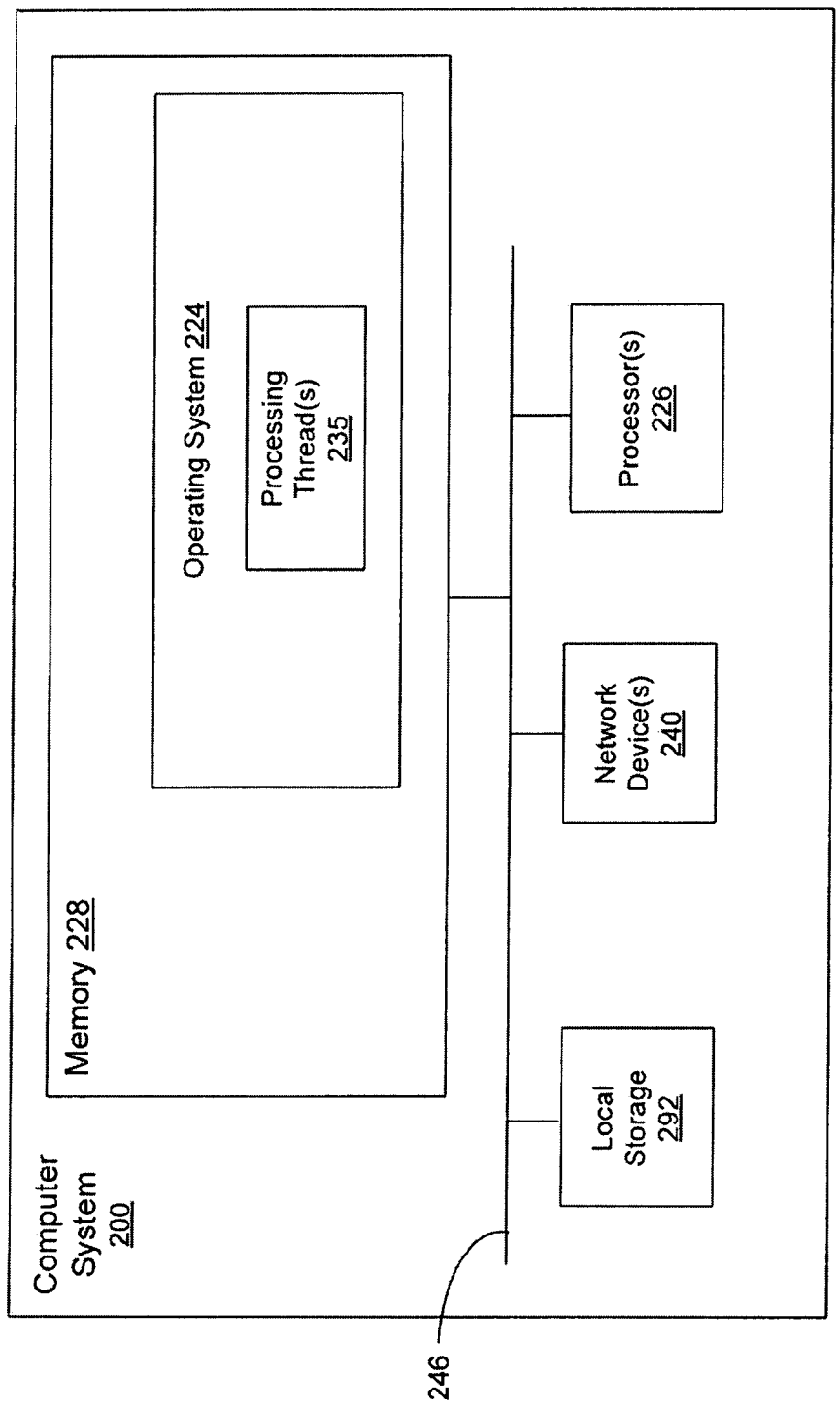
FIG. 2 is a schematic block diagram of an exemplary computer system that may be employed in the storage system environment of FIG. 1.

FIG. 2 is a schematic block diagram of an exemplary computer system 200 that may be employed in the storage system environment of FIG. 1. The client system 140, server system 110, and/or storage system 120 of FIG. 1 may be implemented as the computer system 200. Those skilled in the art will understand that the embodiments described herein may apply to any type of computer system, such as a special-purpose computer (e.g., file serving appliance) or general-purpose computer, including a standalone computer, embodied or not embodied as a storage system. The computer system 200 comprises processor(s) 226, memory 228, one or more network devices/adapters 240, and a local storage 292 coupled by a bus 246.

The processors, 226 comprise the central processing units (CPUs) of the computer system 200 and control the overall operation of the computer system 200. In certain embodiments, the processors 226 accomplish this by executing software, such as software described below. The processors 226 may include one or more programmable general-purpose or special-purpose microprocessors, digital signal processors (DSPs), programmable controllers, application specific integrated circuits (ASICs), programmable logic devices (PLDs), or the like, and/or a combination of such devices.

The memory 228 comprises storage locations that are addressable by the processor 226 and adapters, such as a network device/adapter 240. The memory 228 may be a random access memory (RAM), a read-only memory (ROM), or the like, or a combination of such devices. It will be apparent to those skilled in the art that other processing and memory means, including various computer readable media, may be used for storing and executing program instructions pertaining to embodiments described herein. The storage locations in memory 228 may comprise data structures or data buffers for implementing processing threads for receiving or transmitting network data as described herein. As used herein, network data refers to data received over a network or data to be transmitted over a network, where the network data may be received or transmitted in the form of packets.

The memory 228 may also store software program code such as an operating System 224. The operating system 224 can be, for example, UNIX®, Windows NT®, Linux®, Data ONTAP™, or another operating system. The operating system 224 is a program that, after being initially loaded into the memory 228, defines and produces one or more processing threads 235 for receiving and transmitting data over a network using a network device 240. The number of processing threads defined and produced by the operating system 224 may depend on a variety of factors, such as the number of processors 226, number of network devices 240, etc. A thread may comprise a predetermined process defined by the operating system 224 and executed by a processor 226. Each processing thread 235 may implement/execute a particular software layer of the operating system 224 to process the network data and then pass the data to the next processing thread 235 for further processing. As used herein, a "single-threaded software layer" indicates a software layer in which the operating system 224 has defined and made available a single processing thread for implementing the software layer, whereas a "multi-threaded software layer" indicates a software layer in which the operating system 224 has defined and made available two or more processing threads for simultaneously implementing the software layer.

In some embodiments, upon initialization/booting, the operating system 224 defines two or more iSCSI socket threads configured for implementing an iSCSI socket software layer to process network data. In some embodiments, the operating system 224 also defines two or more network threads configured for implementing a network stack software layer to process network data, wherein the operating system 224 defines the number of iSCSI socket threads to equal the number of network threads. In further embodiments, the operating system 224 defines a single iSCSI protocol thread configured for implementing an iSCSI protocol software layer to process network data. In these embodiments, the two or more iSCSI socket threads are configured to work in conjunction with the two or more network threads as well as the single iSCSI protocol thread to process network data.

A network device 240 may comprise mechanical, electrical and signaling circuitry needed to connect the computer system 200 to the network and to receive and transmit data over the network. The network device 240 may comprise a network interface controller (e.g., Ethernet cards), network adapter, or any other physical device that controls the receiving and transmitting of data over a network. A network device 240 may provide one or more data access ports for coupling the computer system 200 to one or more other computer systems through a network (such as point-to-point links, wide area networks, virtual private networks implemented over a public network (Internet), a shared local area network, etc.). A connection and session with an external computer system may be established using a data access port of the network device 240 to receive data. Via the network, the network device 240 may receive data in the form of data packets formatted to allow proper transport over the network according to a particular communication protocol format (such as iSCSI Protocol, Transport Control Protocol (TCP), Internet Protocol (IP), etc.).

The processor 226 and the network devices 240 may comprise processing elements and/or logic circuitry configured to execute the software code stored in memory 228 and manipulate various addressable storage locations (such as in data structures and/or data buffers) in memory 228. The local storage 292 is a device that stores software code and information within the computer system 200, such as the operating system 224, and associated data. The computer system 200 loads the software and information into the memory 228 from which they are accessed by the processors 226.

Figure 3:
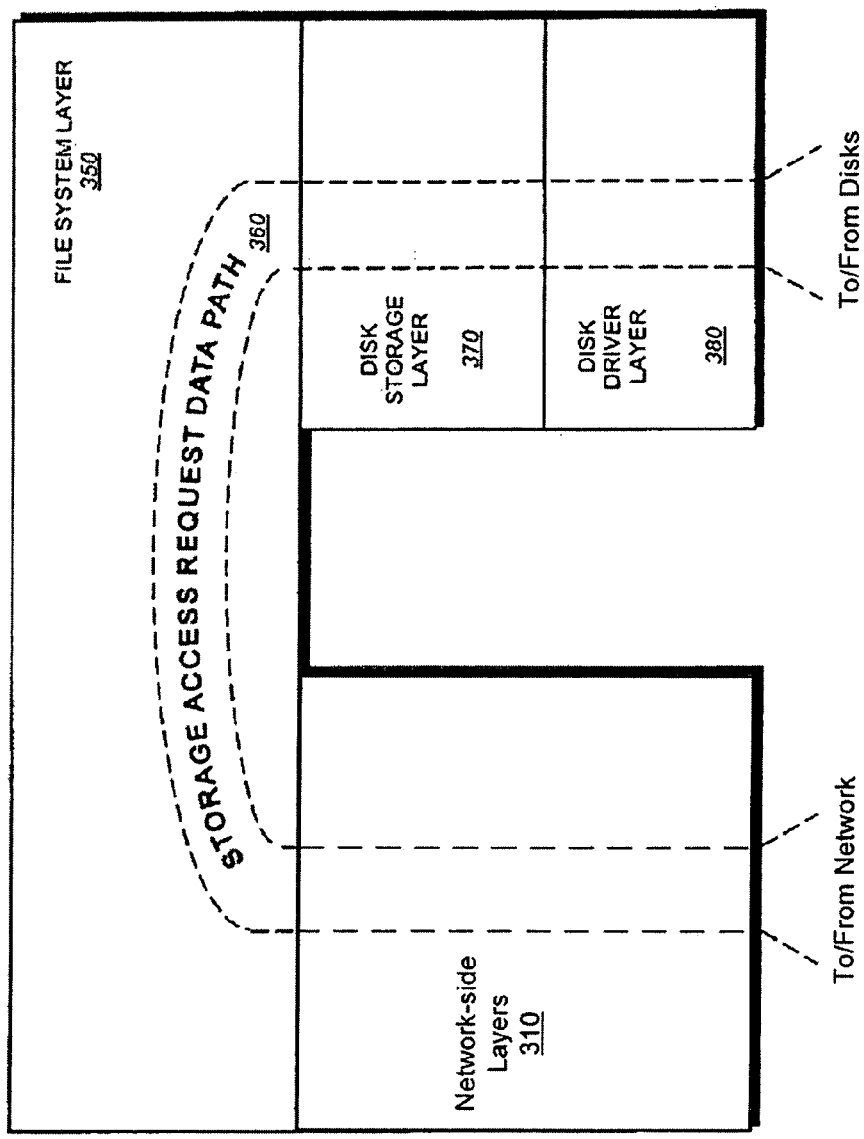
FIG. 3 is a conceptual diagram of various software layers of an operating system.

FIG. 3 is a conceptual diagram of various software layers of an operating system 224. In some embodiments, the operating system 224 comprises a microkernel operating system of a storage system 120. The software layers provide data paths 360 for servers 110 to access data stored on the storage system 120 using access protocols (such as the iSCSI protocol). The various software layers include network-side layers 310 and disk-side layers (including disk storage layer 370 and disk driver layer 380).

The operating system 224 implements the network-side layers 310 to interact with a server 110 by transmitting and receiving network data to and from the server 110. The received network data may comprise requests for data stored on a particular storage device 194 of the storage system 120 or requests to modify data on a storage device 194 along with the new data to be stored. The transmitted network data may comprise responses containing requested data or status information regarding a previous request received from the server system 110. Network-side layers 310 include layers that process network data according to particular protocols (e.g., Internet Protocol, Transport Control Protocol, iSCSI, etc.). Network side layers 310 are discussed below in relation to FIGS. 4A-B. The operating system 224 implements the disk-side layers to interact with the storage device 194 of the storage system 120. The operating system 224 manages the storage devices 194 using the disk storage layer 370 that implements a disk storage protocol (such as a RAID protocol) and the disk driver layer 380 that implements a disk control protocol (such as small computer system interface (SCSI), integrated drive electronics (IDE), etc.).

A server system may send file access requests encapsulated in NFS protocol packets to access files within a WAFL file system on a storage system. A server system may also send SCSI requests encapsulated in iSCSI protocol packets to access LUNs within a SCSI target on a storage system. These LUNs may be represented as files within a WAFL file system and the SCSI requests to those LUNs may be translated internally in the storage system into file accesses.

Bridging the network-side software layers 310 with the disk-side software layers is a file system layer 350 of the operating system 224. In an illustrative embodiment, the layer 350 implements a file system having an on-disk format representation that is block-based using, e.g., 4-kilobyte (KB) data blocks and using modes to describe the files. An mode is a data structure used to store information about a file, such as ownership of the file, access permission for the file, size of the file, name of the file, location of the file, etc. In response to receiving a file access request, the file system generates operations to load (retrieve) the requested data from disks 194 if it is not resident in the storage system's memory. An external file handle in the server request typically identifies a file or directory requested by the server 110. Specifically, the file handle may specify a generation number, inode number and volume number corresponding to the server's requested data.

If the information is not resident in the storage system's memory, the file system layer 350 indexes into an inode file using the received inode number to access an appropriate entry and retrieve a logical volume block number. The file system layer 350 then passes the logical volume block number to the disk storage (RAID) layer 370, which maps that logical number to a disk block number and sends the latter to an appropriate driver of the disk driver layer 380. The disk driver 380 accesses the disk block number from disks 194 and loads the requested data in memory for processing by the storage system 120. Upon successful completion of the request, the storage system (and operating system) returns a response to the server 110 over the network.

It should be noted that the software "path" 360 through the operating system layers described above needed to perform data storage access for the server request received at the storage system may alternatively be implemented in hardware or a combination of hardware and software. That is, in an alternative embodiment, the storage access request path 360 may be implemented as logic circuitry embodied within a field programmable gate array (FPGA) or an application specific integrated circuit (ASIC). This type of hardware implementation may increase the performance of the file service provided by storage system 120 in response to a file system request packet issued by server 110. Moreover, in a further embodiment, the processing elements of network and storage adapters may be configured to offload some or all of the packet processing and storage access operations, respectively, from processor to thereby increase the performance of the file service provided by the storage system.

II. Multi-Threaded and Single-Threaded Software Layers

Figure 4A:
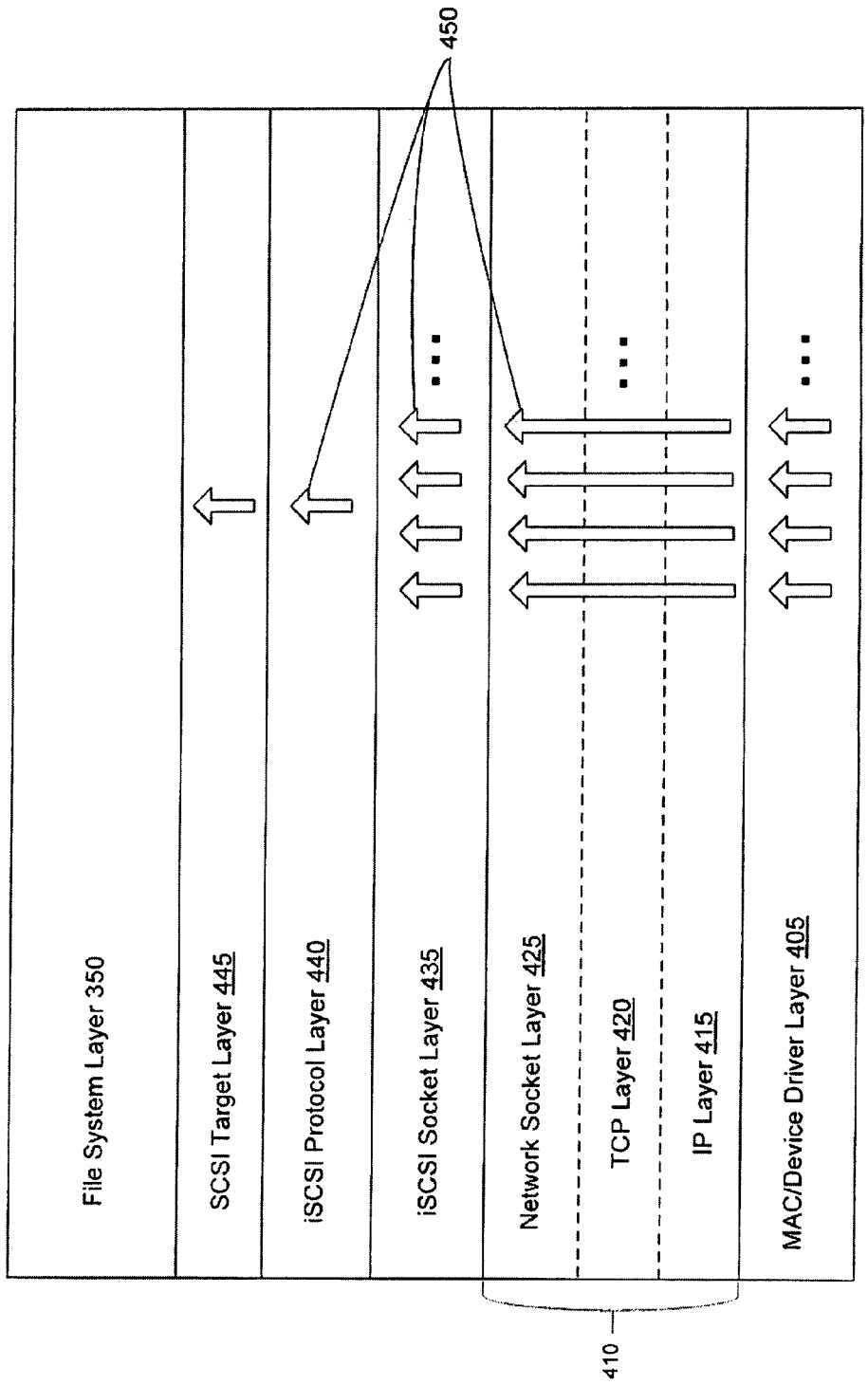
FIGS. 4A-B are conceptual diagrams of various multi-threaded and single-threaded network side layers of an operating system.
Figure 4B:
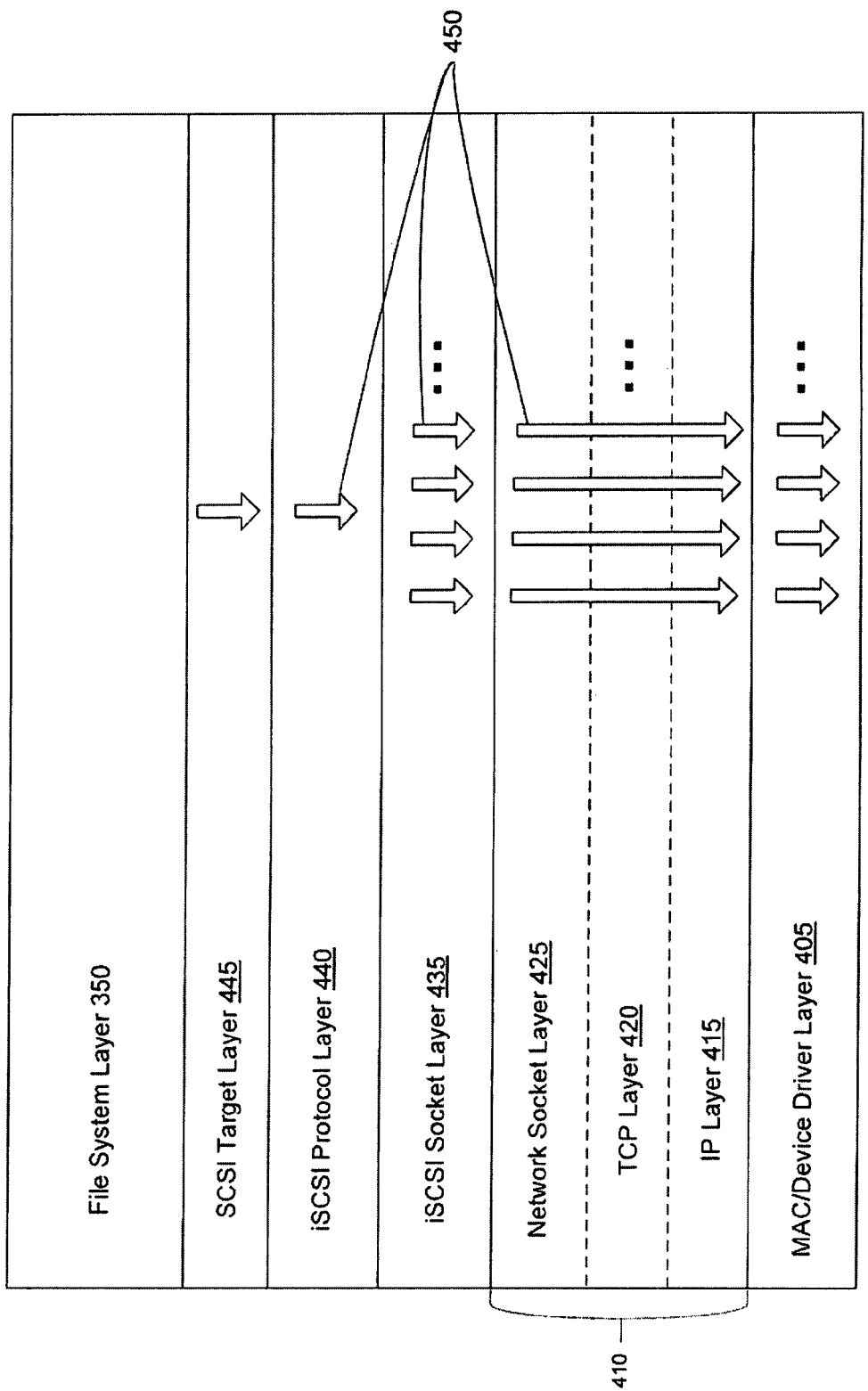

FIGS. 4A-B are conceptual diagrams of various multi-threaded and single-threaded network side layers 310 of an operating system 224. In the embodiments described below, the operating system 224 is implemented in a storage system 120 having a plurality of disks 194. In other embodiments, however, the operating system may be implemented in any computer system 200 (such as a client system 140 or server system 110). The network-side layers 310 comprise software layers for processing network data. In the example of FIG. 4, the network-side layers 310 comprise a media access layer (MAC)/device driver layer 405, network stack layer 410, an iSCSI socket layer 435, an iSCSI protocol layer 440, and a SCSI target layer 445. The various network-side layers 310 shown in FIGS. 4A-B are for illustrative purposes only, and in other embodiments, other network-side layers 310 are implemented by the operating system 224.

Operating System Software Layers

The MAC layer 405 interfaces with network communication and protocol layers in the network stack layer 410 (discussed below). The MAC layer 405 also includes a device driver layer for controlling and operating one or more network devices 240 to receive or transmit data over a network. In the example of FIG. 4, the network stack layer 410 comprises an Internet Protocol (IP) layer 415, a Transport Control Protocol (TCP) layer 420, and a network socket layer 425. The network layers from 405 to 425 may also be implemented in hardware. In other embodiments, the network stack layer 410 comprises other software layers. As known in the art, the IP layer 415 may be used to implement the Internet Protocol for routing data packets to their intended destinations over a network. The TCP layer 420 may be used to implement the Transport Control Protocol for ensuring reliable transport of data packets over a network. The network socket layer 425 serves as the software interface/connection to the network stack layer 410 and interfaces with the iSCSI socket layer 435.

The iSCSI socket layer 435 and the iSCSI protocol layer 440 comprise an iSCSI subsystem layer used for implementing the iSCSI protocol. In general, the iSCSI protocol allows the use of the SCSI protocol over TCP/IP networks, where the SCSI protocol can be implemented to operate remote peripherals/targets (such as disks) that respond to SCSI commands. This allows, for example, the server 110 (source) to transmit SCSI commands over the network 130 to remotely access a disk 194 (target) of the storage system 120. The iSCSI subsystem layer may format SCSI commands and data into an iSCSI packet (which is then formatted into a TCP packet, which is then formatted into an IP packet which is sent over the network). As such, an iSCSI packet contains iSCSI protocol formatting as well as SCSI protocol formatting. For example, an iSCSI packet may include an iSCSI header and status data and encapsulates an SCSI command and data.

In general networking terms, a "source" connects to a "destination." For iSCSI, an "initiator" requests a connection with a "target" to access the target, and then sends requests in the form of iSCSI packets to the target over a network. The target sends responses to the requests in the form of iSCSI packets over the network. An iSCSI packet is sometimes referred to as an iSCSI Protocol Data Unit (PDU). A target may comprise one or more LUNs where commands are sent to a target requesting operations on LUNs that the target contains.

To illustrate, the server 110 (source) may transmit the SCSI command "read" by encapsulating the SCSI command in an iSCSI packet, the iSCSI packet specifying a particular disk 194 (LUN) of the storage system 120 from which to read and the SCSI command specifying a particular block address and data length within that disk. To the server's application software and disk drivers, the target may appear as a locally attached SCSI disk. The storage system 120 receives the iSCSI packet and removes the iSCSI formatting to retrieve the SCSI command and data. The storage system 120 then uses the SCSI command and data to access and retrieve data at the specified block address of the specified disk 194. The storage system 120 may then return an iSCSI packet containing a response status (e.g. OK or Check Condition) and the requested data (if any).

The iSCSI socket layer 435 interfaces with the network socket layer 425 on one side, and interfaces with the iSCSI protocol layer 440 on the other side. The iSCSI socket layer 435 waits for received packets from the network and triggers/activates the iSCSI protocol layer 440 when packets are received. When receiving packets from the network (i.e., when receiving packets from the network socket layer 425), the iSCSI socket layer 435 performs convenience functions for the iSCSI protocol layer 440 and prepares received packets for processing by the iSCSI protocol layer 440 (e.g., by performing error checking on packets and grouping TCP packets into one or more iSCSI packets/PDUs). The prepared iSCSI packets are then passed to the iSCSI protocol layer 440 which processes the iSCSI packets according to the iSCSI protocol standards. When transmitting iSCSI packets from the network (i.e., when receiving iSCSI packets from the iSCSI protocol layer 440 to be transmitted), the iSCSI socket layer 435 prepares the iSCSI packets for processing by the network stack layer 410 (e.g., by separating each iSCSI packet into one or more TCP packets). The prepared TCP packets are then passed to the network stack layer 410 for further processing.

As known in the art, the SCSI target layer 445 is an additional protocol layer that may be used in storage systems implementing Storage Area Network (SAN) technology. In some SAN storage systems, files are used to simulate physical disks so that an initiator assumes it is accessing an actual disk rather than a file. The SCSI target layer 445 may be implemented to provide this physical disk simulation.

Threads

For each software layer, the operating system 224 defines one or more processing threads 450 that processes network data by implementing/executing the software layer and then passes the network data to the next thread in the next software layer for further processing. When processing network data, the processing threads 450 may pass messages (thread messages) to each other using a message passing scheme provided by the operating system, the thread messages containing information needed to properly process network data between the threads. A single-threaded software layer is a software layer in which the operating system 224 has defined and made available a single processing thread for implementing the software layer, whereas a multi-threaded software layer is a software layer in which the operating system 224 has defined and made available two or more processing threads for simultaneously implementing the software layer.

FIG. 4A shows processing threads 450 that are receiving network data/packets by processing the network data "upwards" through the software layers (i.e., from the MAC layer 405 to the SCSI target layer 445). For example, when receiving network data, a network thread may process the network data by implementing the network stack layer 410, the network thread may then pass the network data to an iSCSI socket thread that processes the network data by implementing the iSCSI socket layer 435, and the iSCSI socket thread may then pass the network data to an iSCSI protocol thread that processes the network data by implementing the iSCSI protocol layer 440, etc. FIG. 4B shows processing threads 450 that are transmitting network data/packets by processing the network data "downwards" through the software layers (i.e., from the SCSI target layer 445 to the MAC layer 405). For example, when transmitting network data, an iSCSI protocol thread may process the network data by implementing the iSCSI protocol layer 440, and then pass the network data to an iSCSI socket thread that processes the network data by implementing the iSCSI socket layer 435, and the iSCSI socket thread may then pass the network data to a network thread that processes the network data by implementing the network stack layer 410, etc. As such, the iSCSI protocol thread interacts with the two or more iSCSI socket threads for processing network data by implementing the iSCSI protocol standard.

Typically, a single processing thread is provided for each network device 240, where a device driver may operate multiple network devices. As such, the MAC/device driver layer 405 is typically multi-threaded. Typically, the network stack layer 410 is multi-threaded, where each network thread processes network data by implementing the IP layer 415, TCP layer 420, and the network socket layer 425.

In some embodiments, the operating system 224 defines and produces two or more iSCSI socket threads for the iSCSI socket layer 435 so that the layer is multi-threaded. In some embodiments, the operating system 224 defines the number of iSCSI socket threads to equal the number of network threads. Typically, some software layers of the operating system (such as the network stack layer 410) are multi-threaded while other software layers (such as the iSCSI protocol layer and the SCSI target layer) are single-threaded. In further embodiments, the operating system 224 defines a single iSCSI protocol thread for the iSCSI protocol layer so that the layer is single-threaded. In these embodiments, the two or more iSCSI socket threads are configured to work in conjunction with the two or more network threads as well as the single iSCSI protocol thread to process network data. As such, multi-threaded network throughput benefits may be gained through the iSCSI socket layer 435 while maintaining compatibility with the existing single-threaded iSCSI Protocol Layer 440.

TCP and iSCSI Connections

As discussed above, the TCP layer 420 may be used to implement the Transport Control Protocol for ensuring reliable transport of data packets over a network. The TCP layer 420 may also be used to establish TCP connections with external computers (such as the server 110) to exchange data over a network 130. The TCP layer may provide a plurality of TCP ports, each port being identified by a port ID number and capable of establishing a TCP connection through the network. Thus each TCP connection may be identified by a source IP address, source TCP port number, a destination IP address, and a destination TCP port number. A target operating system may allocate a temporary port number for an initiator to use in making a TCP connection, where the TCP connection is typically received through a well-known port number on the target. Each network service (e.g., iSCSI) has a well-known TCP port number defined by the network service standards (e.g., for iSCSI network service it may be TCP port number 3260). As such, the target iSCSI subsystem layer may "listen" on port number 3260 for incoming connections. Multiple connections may use the same TCP port number if they are connecting to the same network service.

Each network device 240 may maintain multiple connections through the network through multiple physical ports, each port (a physical socket with support circuitry) maintaining a specific connection. Each port of a network device 240 may operate as a separate device with its own assigned MAC address and its own assigned IP address (so that a connection to the IP address will always be handled by that physical port of the network device). Each physical port (also called a network interface) can handle multiple TCP/IP connections. An iSCSI session may be carried out over one or more TCP connections. If the iSCSI session uses more than one TCP connection, it is a "multiple connection session."

Although the iSCSI protocol is used to exchange packets over a TCP/IP network, the iSCSI protocol may require additional functions not required by the TCP protocol or the SCSI protocol (for performing disk operations). The iSCSI protocol may add security functions to the SCSI protocol by requiring that an initiator login (i.e. identify itself) to a target. For example, the iSCSI protocol may require an initiator requesting a connection and session with a particular target to first establish a TCP connection with the target and then establish an iSCSI connection with the target by logging into the target with an initiator name and an optional password. Multiple iSCSI connections may then be established with the same target during the session. As a further example, in TCP/IP networks, data packets can be delivered out of order due to network congestion or the delivery of packets over a multiple connection session. The iSCSI packet headers may include sequence numbers for SCSI commands and status responses that allow the source and target to order packets in the correct sequence and to detect lost packets. For each established TCP or iSCSI connection, the operating system 224 typically assigns a single processing thread in each software layer to service the connection (i.e., receive and transmit network data for the connection). Although a connection is serviced by a single processing thread, each processing thread can typically service multiple connections running at the same time.

III. Protections Against Operational Incompatibilities Between a Multi-Threaded iSCSI Socket Layer and a Single-Threaded iSCSI Protocol Layer Implementing the iSCSI socket layer 435 as a multi-threaded layer while implementing the iSCSI protocol layer as a single-threaded layer may, however, cause operational incompatibilities between the iSCSI socket layer and the iSCSI protocol layer since the single iSCSI protocol thread now has to operate in conjunction with two or more iSCSI socket threads to process network data. In some embodiments, protections against operational incompatibilities between the multi-threaded iSCSI socket layer and the single-threaded iSCSI protocol layer are provided.

Proper Thread Message Delivery

As discussed above, a data packet is processed by a number of different processing threads, each thread implementing/executing a particular software layer to process the data packet and then passing the data packet to the next thread for further processing. When processing data packets, the processing threads may pass messages (thread messages) to each other using a message passing scheme provided by the operating system, the thread messages containing information needed to properly process data packets between the threads. Typically, thread messages are easily passed between the iSCSI socket thread and the iSCSI protocol thread since there is typically only a single iSCSI socket thread and a single iSCSI protocol thread.

In a multi-threaded iSCSI socket layer, however, mechanisms for delivery of thread messages from a single iSCSI protocol thread to the appropriate one of several iSCSI socket threads may be needed for proper processing of the data packets. In some embodiments, each iSCSI socket thread is identified by a unique identifier (e.g., as provided by the operating system) to assure delivery of thread messages to the proper iSCSI socket thread. In some embodiments, the identifier of a particular iSCSI socket thread may be stored to a shared data structure (i.e., a data structure that is accessible by both the particular iSCSI socket thread and the iSCSI protocol thread) and may be retrieved by the iSCSI protocol thread to identify which iSCSI socket thread to send a thread message.

As discussed above, for each established connection, the operating system 224 typically assigns a single processing thread in each software layer to service the connection (i.e., receive and transmit network data for the connection). For example, for a particular connection, the operating system 224 may assign a specific iSCSI socket thread in the iSCSI socket layer 435 and assign the iSCSI protocol thread in the iSCSI protocol layer 440 to service the particular connection.

For each connection, the operating system 224 may also allocate a set of "per-connection" data structures and data butlers (e.g., comprising allocated areas of memory 228) for exclusive use by the iSCSI protocol and socket threads assigned to service the connection. As known in the art, per-connection data structures and data buffers indicate data structures and data buffers that are associated/linked with a particular connection or connection description (e.g., as described by a source IP address and TCP port number, a destination IP address and TCP port number, lists of packets received and transmitted through the connection, etc.). As used herein, per-connection data structures and data buffers are sometimes referred to herein as shared data structures and data buffers (as the data structures and data buffers are both accessible by the iSCSI protocol and socket threads).

When receiving network packets (i.e., when processing network packets "upwards" through the software layers), after the iSCSI socket thread finishes processing the network packets, the iSCSI socket thread stores the processed network packets to a shared data buffer and stores processing information to a shared data structure to be read by the iSCSI protocol thread for further processing of the network packets in the shared data buffer. When transmitting network packets (i.e., when processing network packets "downwards" through the software layers), after the iSCSI protocol thread finishes processing the network packets, the iSCSI protocol thread stores the processed network packets to a shared data buffer and also stores processing information to a shared data structure to be read by the iSCSI socket thread for further processing of the network packets in the shared data buffer. The shared data structures may be used by the iSCSI protocol and socket threads to store processing information needed to properly process network packets for a particular connection. The shared data structures may store information such as a list of network packets to be processed (assigned work), descriptors of network packets stored in the shared data buffers, pointers/links to network data stored in shared data buffers, received iSCSI operations (e.g. login, abort command), received SCSI commands (e.g., read, write), etc.

When receiving network packets, after the iSCSI socket thread finishes processing the network packets, stores the processed network packets to a shared data buffer, and stores the processing information to a shared data structure, the iSCSI socket thread sends a thread message to the iSCSI protocol thread that activates/triggers the iSCSI protocol thread to start processing the network packets in the shared data buffer. The thread message typically comprises a data packet having a command (e.g. process packets for a particular connection) and a pointer/link to the shared data structure for the particular connection. When receiving the thread message, the iSCSI protocol thread reads the processing information stored in the shared data structure and begins processing the network packets in the shared data buffer according to the processing information. When receiving network packets, even when implementing multiple iSCSI socket threads, delivery of thread messages is not problematic since there is a single iSCSI protocol thread, whereby all thread messages from the iSCSI socket threads are sent to the same iSCSI protocol thread.

When transmitting network packets, after the iSCSI protocol thread finishes processing the network packets, stores the processed network packets to a shared data buffer, and stores the processing information to a shared data structure, the iSCSI protocol thread sends a thread message to the iSCSI socket thread. When receiving the thread message, the iSCSI socket thread reads the processing information stored in the shared data structure and begins processing the network packets in the shared data buffer according to the processing information. When transmitting network packets, when implementing multiple iSCSI socket threads, delivery of thread messages may be problematic since there are now multiple iSCSI socket threads that may receive the thread message (while only the particular iSCSI socket thread assigned to service the particular connection should receive the thread message).

In some embodiments, the operating system 224 assigns an identifier (such as a process identifier) to each of a plurality of iSCSI socket threads that uniquely identifies each iSCSI socket thread. For example, when the operating system assigns an iSCSI socket thread to a particular connection, the operating system may produce the iSCSI socket thread and assign a unique identifier to the iSCSI socket thread. As such, for each connection, the operating system may allocate a particular set of shared data structures and data buffers and assign the iSCSI protocol thread and a particular iSCSI socket thread having a particular identifier to service the connection using the particular set of shared data structures and data buffers.

Figure 5:
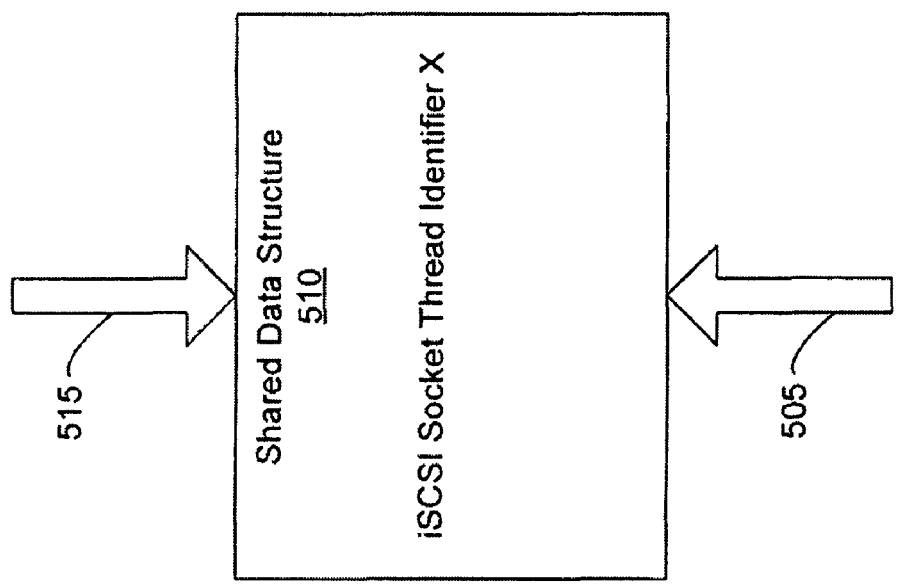
FIG. 5 is a conceptual diagram illustrating showing an example of an iSCSI socket thread that is configured to store its identifier to a shared data structure.

In these embodiments, the identifier of the iSCSI socket thread may be stored to one or more shared data structure for the connection. For example, the operating system 224 or the iSCSI socket thread may be configured to store the identifier to one or more shared data structure for the connection. FIG. 5 is a conceptual diagram illustrating showing an example of an iSCSI socket thread 505 that is configured to store its identifier to a shared data structure 510. In these embodiments, the operating system 224 or the iSCSI protocol thread may be configured to read the iSCSI socket thread identifier from the shared data structure to determine which iSCSI socket thread will receive messages from the iSCSI protocol thread for a particular connection. FIG. 5 shows an example of an iSCSI protocol thread 515 that is configured to read the iSCSI socket thread identifier from the shared data structure 510.

In some embodiments, when transmitting network packets, after the iSCSI protocol thread finishes processing the network packets, stores the processed network packets to a shared data buffer, and stores the processing information to a shared data structure, the iSCSI protocol thread also reads the iSCSI socket thread identifier from the shared data structure and then sends a thread message to the particular iSCSI socket thread associated with the identifier. As such, the appropriate iSCSI socket thread assigned to servicing the connection associated with the shared data structure will receive the thread message. Without identification of the iSCSI socket threads, the iSCSI protocol thread may not be to determine which iSCSI socket thread is servicing a particular connection and may send a thread message to the incorrect iSCSI socket thread.

Multiple Freed Data Structure Lists

As discussed above, when receiving network packets (i.e., when processing network packets "upwards" through the software layers), the iSCSI socket thread processes the network packets, stores the processed network packets to a shared data buffer, and stores processing information to a shared data structure. The iSCSI protocol thread then processes the network packets in the shared data buffer according to the processing information stored in the shared data structure. When the iSCSI protocol thread completes its processing operations, the shared data structure and data buffers may be freed for later use by an iSCSI socket thread that again stores processing information to the data structure and processed packets to the data buffer for processing by the iSCSI protocol thread. This process repeats continuously to re-use/recycle the data structures and data buffers within the iSCSI subsystem layer (i.e., re-use the data structures and data buffers between the iSCSI protocol and sockets threads) without requiring further data structure and data buffer allocations to the iSCSI subsystem layer by the operating system 224 and processor 226.

Typically, the iSCSI protocol thread adds freed data structures and data buffers to a single "freed data structure and data buffer" list stored in memory 228 (e.g., by storing the address ranges of a freed data structures or buffers to the list). The "freed data structure and data buffer" list is sometimes referred to herein as the "freed list." The iSCSI protocol thread is sometimes referred to as a "producer" for the freed list since, when finished using data structures or buffers, it adds such data structures or buffers to the list. The iSCSI socket thread is sometimes referred to as a "consumer" for the freed list since it removes and uses data structures or buffers from the list. Typically, a single iSCSI protocol thread (producer) adds data structures or buffers to a single freed list and a single iSCSI socket thread (consumer) removes and uses data structures or buffers from the single freed list. When implementing multiple iSCSI socket threads, however, two or more iSCSI socket threads (two or more consumers) may attempt to simultaneously remove and use the same data structure or buffer from the freed list, thus causing data structure or buffer usage conflicts.

In some embodiments, to avoid such data structure or buffer usage conflicts when implementing multiple iSCSI socket threads, a separate freed list is provided for each iSCSI socket thread from which the single iSCSI protocol thread adds data structures and from which the iSCSI socket thread removes and uses data structures. As such, each freed list again has a single producer (the single iSCSI protocol thread) and a single consumer (a particular iSCSI socket thread), thus avoiding data structure and buffer usage conflicts. Allowing a single producer and single consumer for each freed list is sometimes referred to herein as an "exclusive use" feature of a freed list.

Figure 6:
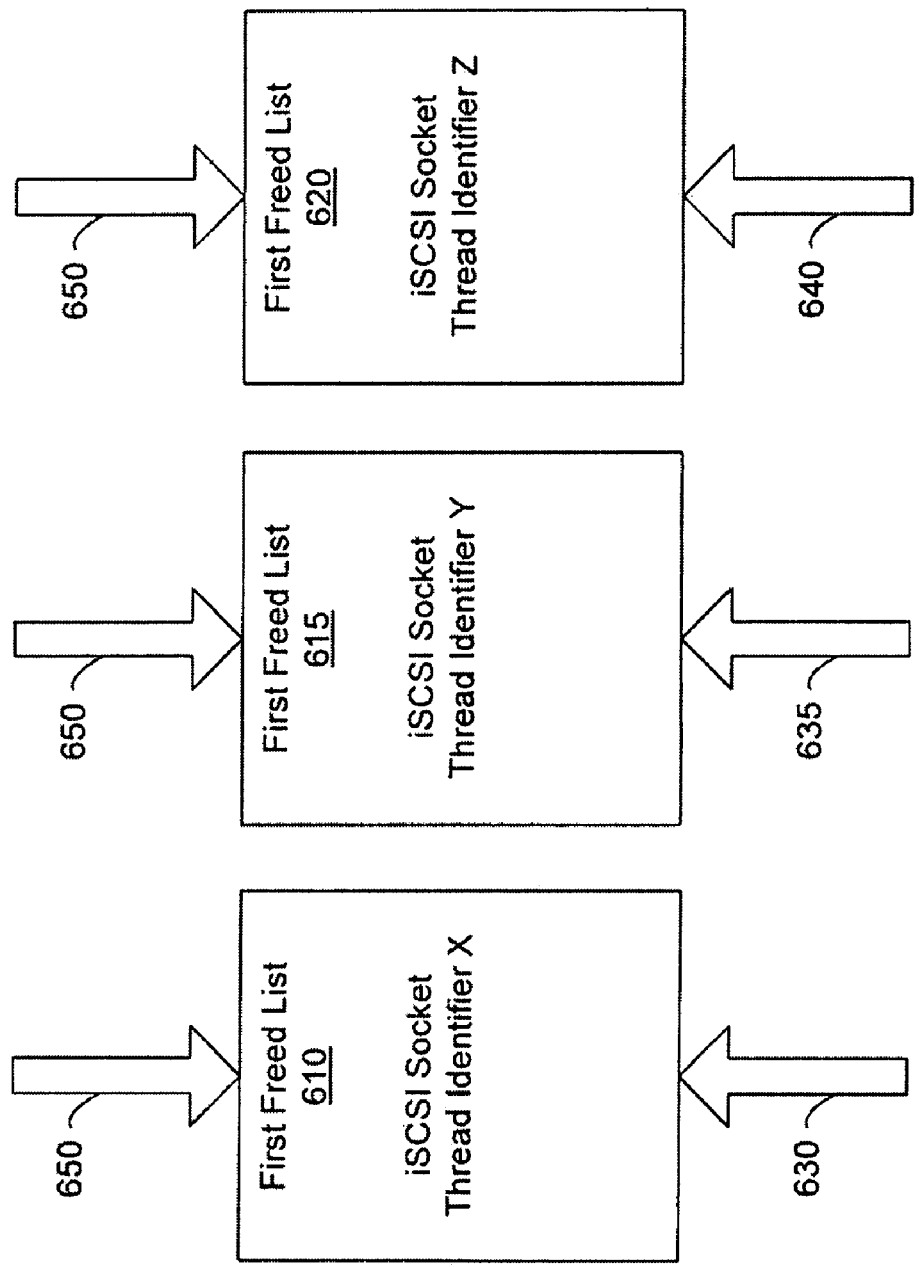
FIG. 6 is a conceptual diagram illustrating separate freed lists provided for a plurality of iSCSI socket threads.

FIG. 6 is a conceptual diagram illustrating separate freed lists 610, 615, 620 provided for a plurality of iSCSI socket threads 630, 635, 640. As shown in the example of FIG. 6, the iSCSI protocol thread 650 adds data structures and buffers to each freed list 610, 615, 620. A first iSCSI socket thread 630 removes and uses data structures and buffers from a first freed list 610 and is the only iSCSI socket thread that may do so (i.e., the "exclusive use" feature of the freed list). A second iSCSI socket thread 635 removes and uses data structures and buffers from a second freed list 615 and is the only iSCSI socket thread that may do so, etc.

In some embodiments, the operating system 224 is configured to provide a freed list (e.g., allocate an area in memory 224 for the freed list) for each iSCSI socket thread it defines and makes available. In some embodiments, the freed list is allocated by the operating system in a "per-connection" manner so that each freed list is allocated for a particular connection or connection description for use only by the iSCSI protocol thread (as a producer) and the particular iSCSI socket thread (as a consumer) assigned by the operating system 224 to service the connection. As such, the "per-connection" allocation of freed lists may provide the "exclusive use" feature for each freed list (since the particular iSCSI socket thread assigned to service a particular connection is the only iSCSI socket thread that may access a particular freed list).

In other embodiments, each freed list may be associated with a particular iSCSI socket thread that may access the freed list. In the example of FIG. 6, each freed list 610, 615, 620 is associated with a particular iSCSI socket thread 630, 635, 640 through use of the thread identifiers of the iSCSI socket threads. As shown in FIG. 6, the thread identifier of an associated iSCSI socket thread is associated with a particular freed list (and may be stored to the particular freed list in some embodiments). A thread identifier stored to a particular freed list may then be used by the operating system 224 to manage thread access to the freed list based on the thread identifier, whereby the iSCSI socket thread having the same identifier is the only iSCSI socket thread allowed to access the particular freed list.

Note that when transmitting network packets (i.e., when processing network packets "downwards" through the software layers), the single iSCSI protocol thread processes the network packets, stores the processed network packets to a shared data buffer, and stores processing information to a shared data structure. The iSCSI socket thread then processes the network packets in the shared data buffer according to the processing information stored in the shared data structure. When the iSCSI socket thread completes its processing operations, the shared data structure and data buffers may be added to the freed list for later use by the iSCSI protocol thread. As such, when transmitting network packets, the iSCSI socket thread is the producer for the freed list and the iSCSI protocol thread is the consumer for the freed list. Even if a single freed list is implemented, although there are multiple producers (iSCSI socket threads) of the freed list, there is only a single consumer for the freed list at all times (since there is a single iSCSI protocol thread). As such, when transmitting data packets using multiple iSCSI socket threads, use of a single freed list may not cause data structure or buffer usage conflicts. In some embodiments, when transmitting data packets using multiple iSCSI socket threads, the operating system 224 may implement multiple freed lists or a single freed list for use by all iSCSI socket threads.

As described above, freed lists may be implemented without requiring locking of the freed list (where the operating system uses a locking mechanism to only allow a single thread to access the freed list at any given time). This is advantageous in that use of the locking mechanism reduces performance. Instead of use of the locking mechanism, the embodiments herein provide multiple freed lists when multiple threads are used, where one freed list is provided per pair of producer/consumer threads.

Method for Implementing a Multi-Threaded iSCSI Socket Layer

Figure 7A:
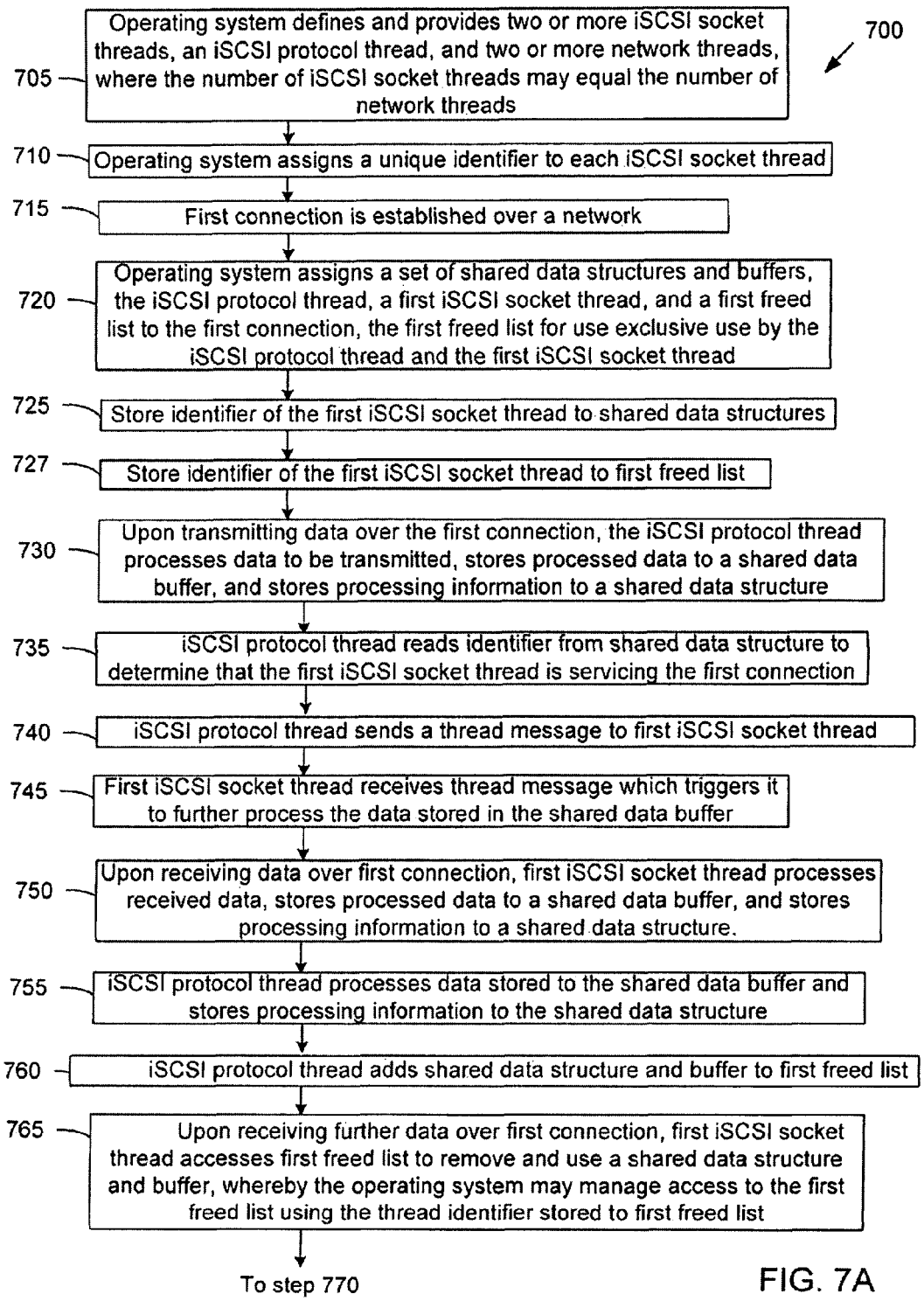
FIGS. 7A-B are flowcharts of a method for operating a computer system having a multi-threaded iSCSI socket layer.
Figure 7B:
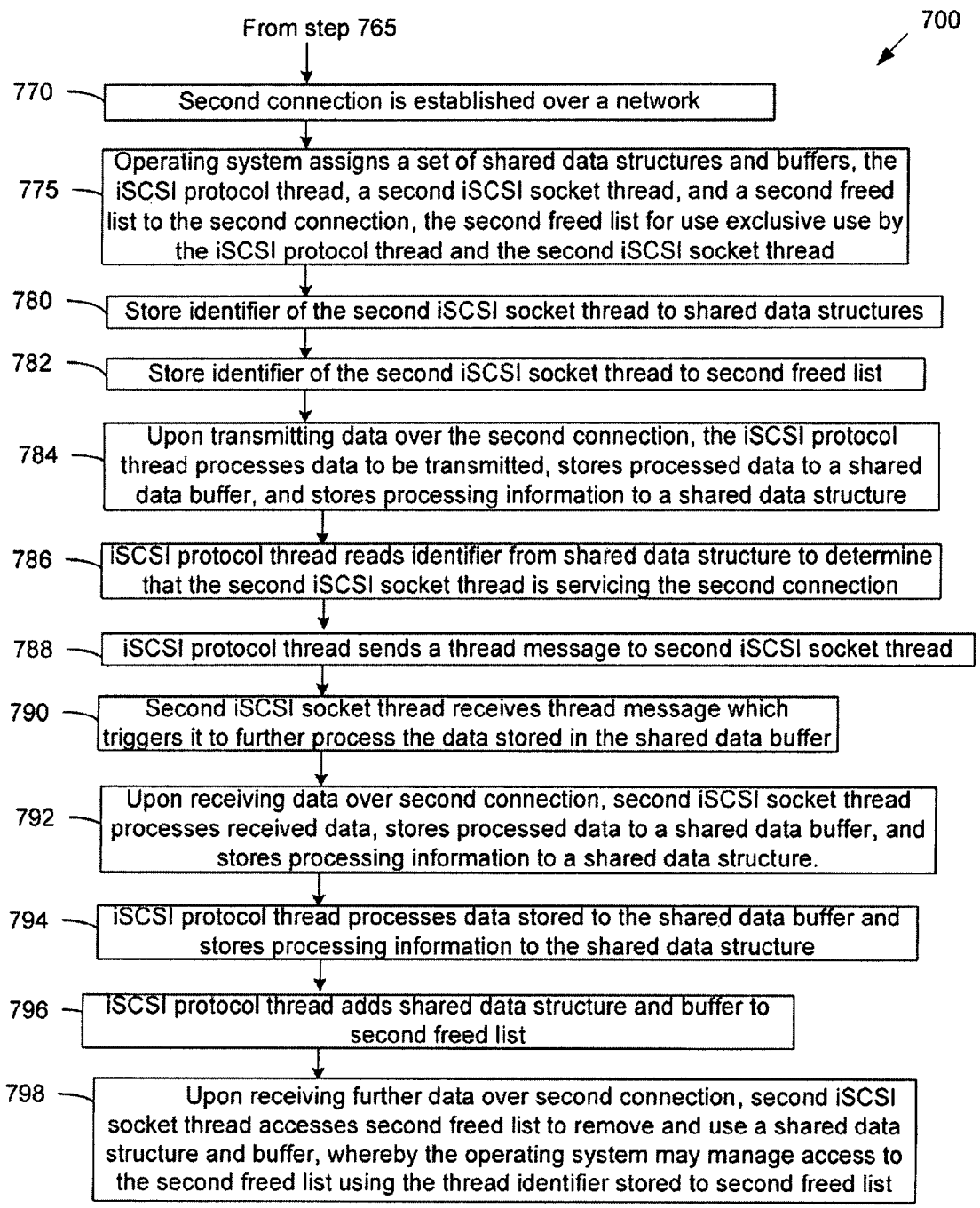

FIGS. 7A-B are flowcharts of a method 700 for operating a computer system 200 having a multi-threaded iSCSI socket layer for receiving and transmitting data/packets over a network. In some embodiments, the multi-threaded iSCSI socket layer is operated in conjunction with a single-threaded iSCSI protocol layer. The method 700 may be implemented by software and/or hardware configured to perform the steps of the method 700. In some embodiments, the steps of method 700 are performed by various components of the computer system 200, such as an operating system 224, a memory 228, and a network device 240. The order and number of steps of the method 700 are for illustrative purposes only and, in other embodiments, a different order and/or number of steps are used.

At step 705 of the method 700, the operating system 224 defines and provides two or more iSCSI socket threads for processing network data though the iSCSI socket layer. In some embodiments, the operating system 224 further defines and provides (at 705) a single iSCSI protocol thread for processing network data though the iSCSI protocol layer. In further embodiments, the operating system 224 further defines and provides (at 705) two or more network threads for processing network data though the network stack layer. In an alternative embodiment, the operating system 224 may define the number of iSCSI socket threads to equal the number of network threads. The operating system then assigns (at 710) a unique thread identifier to each defined iSCSI socket thread.

A first connection is then established (at 715) between the computer system 200 and an external computer over a network. The operating system 224 then assigns (at 720) a first set of shared "per-connection" data structures and buffers, the iSCSI protocol thread, and a first specific iSCSI socket thread (e.g., having thread identifier X) to service the first connection using the first set of shared data structures and buffers (e.g., in memory 228). In some embodiments, the operating system 224 may also allocate (at 720) a first freed list (e.g., in memory 228) for use exclusive use by the iSCSI protocol thread and the first iSCSI socket thread, whereby other iSCSI socket threads may not access the first freed list. The thread identifier (e.g., thread identifier X) of the first iSCSI socket thread may be stored (at 725) to one or more shared data structures for the connection (used to indicate that the first iSCSI socket thread is servicing the first connection). For example, the operating system 224 or the first iSCSI socket thread may store the thread identifier to the one or more shared data structures. In an alternative embodiment, the thread identifier of the first iSCSI socket thread may be stored (at 727) to the first freed list allocated for the first connection (used to indicate that the first iSCSI socket thread is permitted to access the first freed list). For example, the operating system 224 or the first iSCSI socket thread may store the thread identifier to the first freed list.

When the computer system 200 produces data for transmitting over the first connection, the iSCSI protocol thread processes (at 730) the data to be transmitted, stores the processed data to a shared data buffer, and stores processing information to a shared data structure. The iSCSI protocol thread then reads (at 735) the thread identifier from the shared data structure to determine that the first iSCSI socket thread is servicing the first connection. The iSCSI protocol thread sends (at 740) a thread message to the first iSCSI socket thread (which is identified by the thread identifier). The first iSCSI socket thread then receives (at 745) the thread message which activates/triggers the first iSCSI socket thread to further process the data stored in the shared data buffer according to the processing information stored in the shared data structure.

When the computer system 200 receives data over the connection, the first iSCSI socket thread processes (at 750) the received data, stores the processed data to a shared data buffer, and stores processing information to a shared data structure. The iSCSI protocol thread then further processes (at 755) the data stored to the shared data buffer and stores processing information to the shared data structure. The iSCSI protocol thread then adds (at 760) the shared data structure and buffer to the first freed list allocated for the first connection (e.g., stores the address ranges of the shared data structure and buffer to the first freed list). Upon receiving further data over the first connection, the first iSCSI socket thread accesses (at 765) the first freed list to remove and use a shared data structure and buffer from the first freed list to process the received data (e.g., removes address ranges of a shared data structure and buffer from the first freed list and uses those address ranges to process the received data). In some embodiments, the operating system 224 manages access (at 765) to the first freed list by allowing an iSCSI socket thread having the same identifier stored to the first freed list to access the first freed list and restricting access to all other iSCSI socket threads.

A second connection is then established (at 770) between the computer system 200 and an external computer over a network. The operating system 224 then assigns (at 775) a second set of shared "per-connection" data structures and buffers and the iSCSI protocol thread and a second iSCSI socket thread (e.g., having thread identifier Y) to service the second connection using the second set of shared data structures and buffers. In some embodiments, the operating system 224 may also allocate (at 775) a second freed list for use exclusive use by the iSCSI protocol thread and the second iSCSI socket thread, whereby other iSCSI socket threads may not access the second freed list. The thread identifier (e.g., thread identifier Y) of the second iSCSI socket thread may be stored (at 780) to one or more shared data structures for the connection (used to indicate that the second iSCSI socket thread is servicing the second connection). In an alternative embodiment, the thread identifier of the second iSCSI socket thread may be stored (at 782) to the second freed list (indicate that the second iSCSI socket thread is permitted to access the second freed list).

When the computer system 200 produces data for transmitting over the second connection, the iSCSI protocol thread processes (at 784) the data to be transmitted, stores the processed data to a shared data buffer, and stores processing information to a shared data structure. The iSCSI protocol thread then reads (at 786) the thread identifier from the shared data structure to determine that the second iSCSI socket thread is servicing the second connection. The iSCSI protocol thread sends (at 788) a thread message to the second iSCSI socket thread (which is identified by the thread identifier). The second iSCSI socket thread then receives (at 790) the thread message which activates/triggers the second iSCSI socket thread to further process the data stored in the shared data buffer according to the processing information stored in the shared data structure.

When the computer system 200 receives data over the connection, the second iSCSI socket thread processes (at 792) the received data, stores the processed data to a shared data buffer, and stores processing information to a shared data structure. The iSCSI protocol thread then further processes (at 794) the data stored to the shared data buffer and stores processing information to the shared data structure. The iSCSI protocol thread then adds (at 796) the shared data structure and buffer to the second freed list allocated for the second connection. Upon receiving further data over the second connection, the second iSCSI socket thread accesses (at 798) the second freed list to remove and use a shared data structure and buffer from the second freed list to process the received data. In some embodiments, the operating system 224 manages access (at 798) to the second freed list by allowing an iSCSI socket thread having the same identifier stored to the second freed list to access the second freed list and restricting access to all other iSCSI socket threads. The method 700 then ends.

As such, the method 700 provides a multi-threaded iSCSI socket layer and protections against operational incompatibilities between the multi-threaded iSCSI socket layer and the single-threaded iSCSI protocol layer. Thus, the iSCSI socket software layer may be operated as a multi-threaded layer rather than a single-threaded layer. By doing so, processor idle/down time of the computer system may be reduced to increase data processing efficiency and overall network data throughput, white still being compatible with a single-threaded iSCSI protocol layer.

While the embodiments described herein have been described with reference to numerous specific details, one of ordinary skill in the art will recognize that the embodiments can be embodied in other specific forms without departing from the spirit of the embodiments. Thus, one of ordinary skill in the art would understand that the embodiments described herein are not to be limited by the foregoing illustrative details, but rather are to be defined by the appended claims.

Unless specifically stated otherwise, it is to be appreciated that throughout the discussions utilizing terms such as "processing" or "computing" or "calculating" or "determining" or "displaying" or the like refer to the action and processes of a computer system or similar electronic computing device that manipulates and transforms data represented as physical (e.g. electronic) quantities within the computer systems' registers and memories into other data similarly represented as physical quantities within the computer system.

The embodiments can be implemented by an apparatus for performing the operations herein. This apparatus may be specially constructed for the required purposes or it may comprise a machine, such as a general-purpose computer selectively activated or reconfigured by a computer program (such as a collection of instructions for execution by a machine or processor for example) stored in the computer. Such a computer program may be stored in a computer readable storage medium, such as, but not limited to any type of disk including floppy disks, optical disks, magnetic optical disks, read-only memories, random access memories, EPROMS, EEPROMS, magnetic or optical cards or any type of media suitable for storing physical (e.g. electronic) constructions and each coupled to a computer system bus. Each of these media may be coupled to a computer system bus through use of an appropriate device for reading and or for writing the media.

What is claimed is:

1. A system for processing network data comprising data received over a network or data for transmission over the network, the system comprising:
   computer system hardware configured for:
      providing a subsystem software layer comprising a protocol software layer and a socket software layer, the protocol software layer implementing only one protocol processing thread for processing network data and the socket software layer implementing a plurality of socket processing threads for processing network data;
      providing a thread identifier for each socket processing thread;
      establishing a first connection over the network;
      assigning the protocol processing thread and a first socket processing thread for servicing the first connection using a first freed list, the first freed list comprising data structures available for processing network data, the first freed list being accessible only by the protocol processing thread and the first socket processing thread;
      storing the thread identifier of the first socket processing thread to the first freed list;
      receiving data over the first connection;
      accessing, using the first socket processing thread, the first freed list to remove a first data structure from the first freed list, wherein access to the first freed list is managed by allowing a socket processing thread, having the same thread identifier that is stored to the first freed list, to access the first freed list and restricting access for all other socket processing threads; and
      processing the received data using the first socket processing thread and the first data structure.

2. The system of claim 1, wherein:
   the subsystem software layer comprises an Internet small method interface (iSCSI) subsystem software layer;
   the protocol software layer comprises an iSCSI protocol software layer;
   the protocol processing thread comprises an iSCSI protocol processing thread;
   the socket software layer comprises an iSCSI socket software layer;
   the plurality of socket processing thread comprises a plurality of iSCSI socket processing threads; and
   the iSCSI protocol processing thread interacts with the plurality of iSCSI socket processing threads for processing network data by implementing the iSCSI protocol standard.

3. The system of claim 1, wherein the computer system hardware is further configured for:
   providing a network stack software layer; and
   providing two or more network processing threads for implementing the network stack software layer, wherein the network processing threads interact with the socket processing threads for processing network data, the number of socket processing threads being equal to the number of network processing threads.

4. A method for processing network data comprising data received over a network or data for transmission over the network, the method comprising:
   providing computer system hardware for performing:
      providing a subsystem software layer comprising a protocol software layer and a socket software layer, the protocol software layer implementing only one protocol processing thread for processing network data and the socket software layer implementing a plurality of socket processing threads for processing network data;
      providing a thread identifier for each socket processing thread;
      establishing a first connection over the network;
      assigning the protocol processing thread and a first socket processing thread for servicing the first connection using a first freed list, the first freed list comprising data structures available for processing network data, the first freed list being accessible only by the protocol processing thread and the first socket processing thread;
      storing the thread identifier of the first socket processing thread to the first freed list;
      receiving data over the first connection;
      accessing, using the first socket processing thread, the first freed list to remove a first data structure from the first freed list, wherein access to the first freed list is managed by allowing a socket processing thread, having the same thread identifier that is stored to the first freed list, to access the first freed list and restricting access for all other socket processing threads; and
      processing the received data using the first socket processing thread and the first data structure.

5. The method of claim 4, wherein:
   the subsystem software layer comprises an Internet small method interface (iSCSI) subsystem software layer;
   the protocol software layer comprises an iSCSI protocol software layer;
   the protocol processing thread comprises an iSCSI protocol processing thread;
   the socket software layer comprises an iSCSI socket software layer;
   the plurality of socket processing thread comprises a plurality of iSCSI socket processing threads; and
   the iSCSI protocol processing thread interacts with the plurality of iSCSI socket processing threads for processing network data by implementing the iSCSI protocol standard.

6. The method of claim 4, further comprising:
   providing a network stack software layer; and
   providing two or more network processing threads for implementing the network stack software layer, wherein the network processing threads interact with the socket processing threads for processing network data, the number of socket processing threads being equal to the number of network processing threads.

21

7. A system for processing network data comprising data received over a network or data for transmission over the network, the system comprising:
computer system hardware configured for:
providing a subsystem software layer comprising a protocol software layer and a socket software layer, the protocol software layer implementing only one protocol processing thread for processing network data and the socket software layer implementing a plurality of socket processing threads for processing network data;
providing a thread identifier for each socket processing thread;
establishing a first connection over the network;
assigning the protocol processing thread and a first socket processing thread for servicing the first connection using a first set of data structures and buffers;
storing the thread identifier of the first socket processing thread to each data structure in the first set of data structures and buffers;
processing, using the protocol processing thread, data for transmission over the first connection;
storing processed data to a first data buffer and processing information to a first data structure in the first set of data structures and buffers;
reading a thread identifier stored to the first data structure to determine that the first socket processing thread is servicing the first connection; and
sending a message to the first socket processing thread which activates the first socket processing thread to process data stored in the first data buffer according to processing information stored in the first data structure.

8. The system of claim 7, wherein the computer system hardware is further configured for:
establishing a second connection over the network;
assigning the protocol processing thread and a second socket processing thread for servicing the second connection using a second set of data structures and buffers;
storing the thread identifier of the second socket processing thread to each data structure in the second set of data structures and buffers;
processing, using the protocol processing thread, data for transmission over the second connection;
storing processed data to a second data buffer and processing information to a second data structure in the second set of data structures and buffers;
reading a thread identifier stored to the second data structure to determine that the second socket processing thread is servicing the second connection; and
sending a message to the second socket processing thread which activates the second socket processing thread to process data stored in the second data buffer according to processing information stored in the second data structure.

9. The system of claim 7, wherein:
the subsystem software layer comprises an Internet small method interface (iSCSI) subsystem software layer;
the protocol software layer comprises an iSCSI protocol software layer;
the protocol processing thread comprises an iSCSI protocol processing thread;
the socket software layer comprises an iSCSI socket software layer;
the plurality of socket processing thread comprises a plurality of iSCSI socket processing threads; and

22 the iSCSI protocol processing thread interacts with the plurality of iSCSI socket processing threads for processing network data by implementing the iSCSI protocol standard.

10. The system of claim 7, wherein the computer system hardware is further configured for:
providing a network stack software layer; and
providing two or more network processing threads for implementing the network stack software layer, wherein the network processing threads interact with the socket processing threads for processing network data, the number of socket processing threads being equal to the number of network processing threads.

11. A method for processing network data comprising data received over a network or data for transmission over the network, the method comprising:
providing computer system hardware for performing:
providing a subsystem software layer comprising a protocol software layer and a socket software layer, the protocol software layer implementing only one protocol processing thread for processing network data and the socket software layer implementing a plurality of socket processing threads for processing network data;
providing a thread identifier for each socket processing thread;
establishing a first connection over the network;
assigning the protocol processing thread and a first socket processing thread for servicing the first connection using a first set of data structures and buffers;
storing the thread identifier of the first socket processing thread to each data structure in the first set of data structures and buffers;
processing, using the protocol processing thread, data for transmission over the first connection;
storing processed data to a first data buffer and processing information to a first data structure in the first set of data structures and buffers;
reading a thread identifier stored to the first data structure to determine that the first socket processing thread is servicing the first connection; and
sending a message to the first socket processing thread which activates the first socket processing thread to process data stored in the first data buffer according to processing information stored in the first data structure.

12. The method of claim 11, further comprising:
establishing a second connection over the network;
assigning the protocol processing thread and a second socket processing thread for servicing the second connection using a second set of data structures and buffers;
storing the thread identifier of the second socket processing thread to each data structure in the second set of data structures and buffers;
processing, using the protocol processing thread, data for transmission over the second connection;
storing processed data to a second data buffer and processing information to a second data structure in the second set of data structures and buffers;
reading a thread identifier stored to the second data structure to determine that the second socket processing thread is servicing the second connection; and
sending a message to the second socket processing thread which activates the second socket processing thread to process data stored in the second data buffer according to processing information stored in the second data structure.

13. The method of claim 11, wherein:
the subsystem software layer comprises an Internet small method interface (iSCSI) subsystem software layer;
the protocol software layer comprises an iSCSI protocol software layer;
the protocol processing thread comprises an iSCSI protocol processing thread;
the socket software layer comprises an iSCSI socket software layer;
the plurality of socket processing thread comprises a plurality of iSCSI socket processing threads; and
the iSCSI protocol processing thread interacts with the plurality of iSCSI socket processing threads for processing network data by implementing the iSCSI protocol standard.

14. The method of claim 11, further comprising:
providing a network stack software layer; and
providing two or more network processing threads for implementing the network stack software layer, wherein the network processing threads interact with the socket processing threads for processing network data, the number of socket processing threads being equal to the number of network processing threads.

15. The system of claim 1, wherein the computer system hardware is further configured for:
establishing a second connection over the network;
assigning the protocol processing thread and a second socket processing thread for servicing the second connection using a second freed list, the second freed list comprising data structures available for processing network data, the second freed list being accessible only by the protocol processing thread and the second socket processing thread;
storing the thread identifier of the second socket processing thread to the second freed list;
receiving data over the second connection;
accessing, using the second socket processing thread, the second freed list to remove a second data structure from the second freed list, wherein access to the second freed list is managed by allowing a socket processing thread, having the same thread identifier that is stored to the second freed list, to access the second freed list and restricting access for all other socket processing threads; and
processing the received data using the second socket processing thread and the second data structure.

16. The method of claim 4, further comprising:
establishing a second connection over the network;
assigning the protocol processing thread and a second socket processing thread for servicing the second connection using a second freed list, the second freed list comprising data structures available for processing network data, the second freed list being accessible only by the protocol processing thread and the second socket processing thread;
storing the thread identifier of the second socket processing thread to the second freed list;
receiving data over the second connection;
accessing, using the second socket processing thread, the second freed list to remove a second data structure from the second freed list, wherein access to the second freed list is managed by allowing a socket processing thread, having the same thread identifier that is stored to the second freed list, to access the second freed list and restricting access for all other socket processing threads; and
processing the received data using the second socket processing thread and the second data structure.

* * * * *